C. W. THOMPSON.
VEHICLE SPRING.
APPLICATION FILED OCT. 2, 1919.

1,329,561.

Patented Feb. 3, 1920.
3 SHEETS—SHEET 2.

C. W. THOMPSON.
VEHICLE SPRING.
APPLICATION FILED OCT. 2, 1919.

1,329,561.

Patented Feb. 3, 1920.
3 SHEETS—SHEET 3.

Witness
Chas. L. Giestaur

Inventor
Clarence W. Thompson,
By H. Ralph Burton,
Attorney

UNITED STATES PATENT OFFICE.

CLARANCE W. THOMPSON, OF WILMINGTON, DELAWARE.

VEHICLE-SPRING.

1,329,561.  Specification of Letters Patent.  Patented Feb. 3, 1920.

Application filed October 2, 1919. Serial No. 327,947.

*To all whom it may concern:*

Be it known that I, CLARANCE W. THOMPSON, a citizen of the United States, residing at Wilmington, in the county of New Castle and State of Delaware, have invented certain new and useful Improvements in Vehicle-Springs, of which the following is a specification.

This invention relates to vehicle-springs of the type that include means whereby the rebound of the load is cushioned and stresses and suddenness of movement of the spring-sustained parts lessened.

It is an object of the invention to provide a spring of that kind that will function properly to absorb vertical movement of the running-gear occasioned by irregularities in the roadway and thereby prevent jarring and violent rebounds in the body of the vehicle or other load sustained by the springs, and thus contribute to the easy running of the vehicle.

When read in connection with the description herein, the details of construction and arrangement of parts contemplated by the invention will be apparent from the accompanying drawings, forming part hereof, wherein embodiments of the invention adapted for use on motor-vehicles are disclosed, for purposes of illustration.

While the disclosures herein now are considered to exemplify preferable embodiments of the invention, it is to be understood that it is not the intention to be limited necessarily thereto in interpretation of the claims, as modifications and adaptations within the limits of the claims can be made without departing from the nature and spirit of the invention.

Like reference-characters refer to corresponding parts in the views of the drawings, of which—

Figure 1:
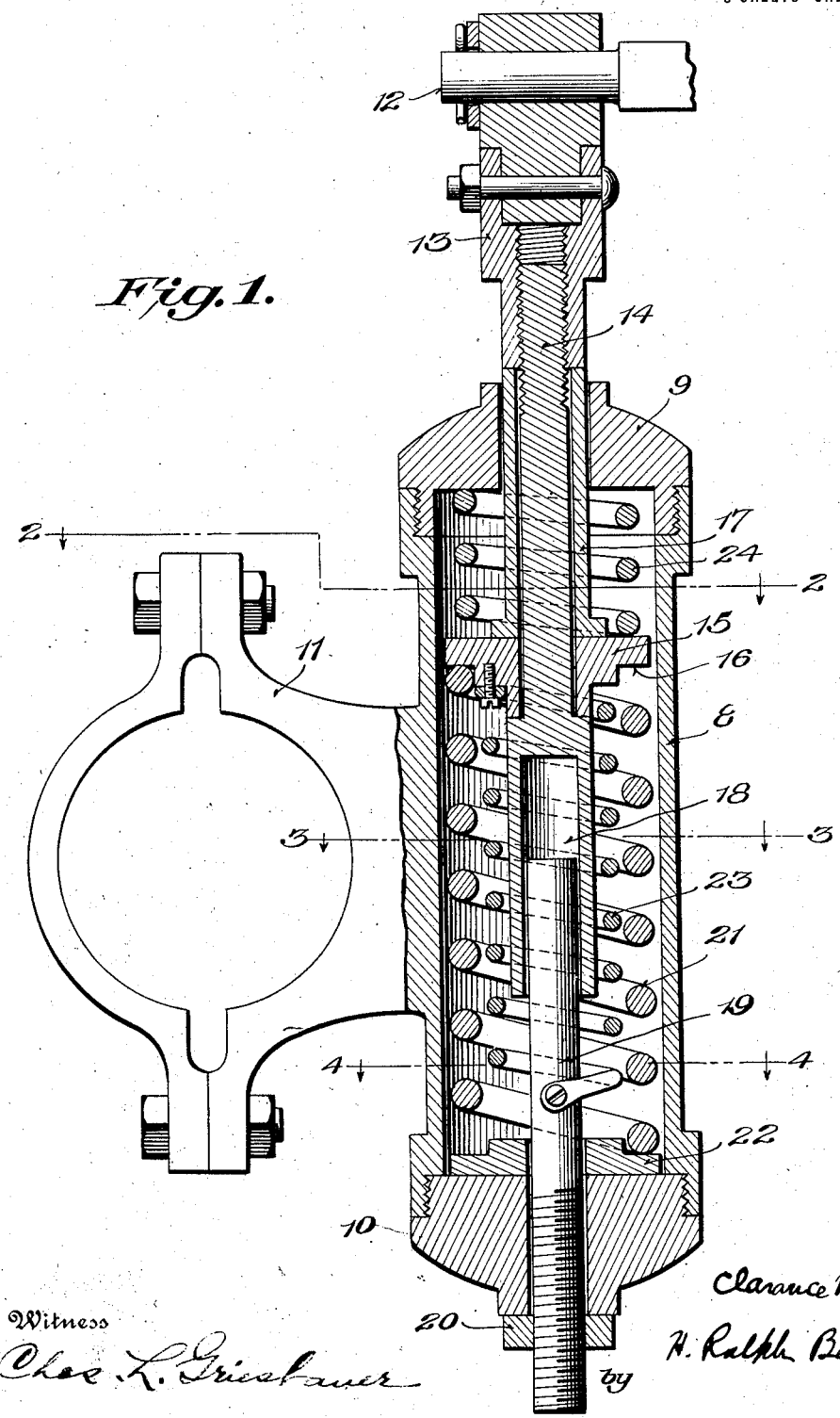
Figure 1 is a longitudinal sectional view of one form.
Figure 2:
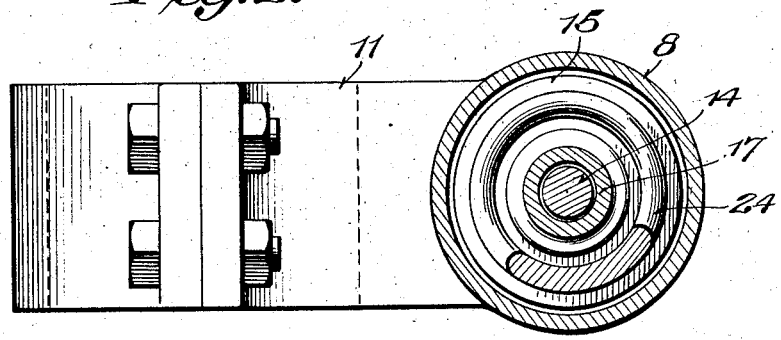
Fig. 2 is a transverse sectional view on the line 2—2, Fig. 1.
Figure 3:
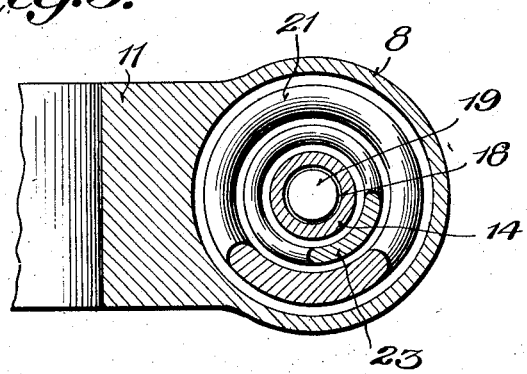
Fig. 3 is a transverse sectional view on the line 3—3, Fig. 1.
Figure 4:
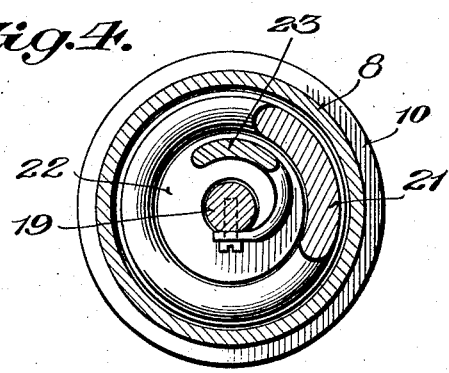
Fig. 4 is a transverse sectional view on the line 4—4, Fig. 1.

Having reference to the drawings, and particularly to Figs. 1 to 4, inclusive, 8 designates a spring-housing, which preferably is of cylindrical form, 9 and 10 closure members screwed in place on the ends of the housing, 11 a bracket or the like whereby the spring-housing is secured to and mounted on an axle or axle-housing, 12 a member arranged to be connected with a vehicle-frame to sustain weight thereof, and 13 a sleeve of that member into which is screwed a rod 14, the rod being adjustable as to length beyond the sleeve by turning in the latter.

The rod 14 extends through the upper end of the housing, and inside of the housing there is slidably mounted on the rod a disk-like abutment 15 having a main-spring seat 16. A sleeve 17 extends upwardly from the abutment 15 around the rod, upon which it is slidable, and through the upper closure member, and at its upper end it normally is in abutment with the sleeve 13. Below the abutment 15, the lower terminal portion of the rod 14 is slightly enlarged to accommodate a socket 18, an abutment being formed at the upper end of the enlargement to limit relative movement of the abutment 15 on the rod. A guide-post 19 projects into this socket, and at the opposite end it extends through the lower closure member 10. Outside of the closure member the post is screw threaded and provided with a nut 20.

A load-sustaining coil-spring 21 is positioned between the seat 16 and a seat 22 in the lower portion of the housing, this spring being tensioned to resist compression and to restrain movement of the abutment 15 under the influence of load toward the lower end of the housing.

A contractile coil-spring 23 is secured at its lower end to the guide-post 19 and at its upper end to the abutment 15, and the tension of this spring may be adjusted by turning nut 20 and thus moving the guide-post upwardly or downwardly, dependent upon the direction the nut is turned.

A compression-resisting coil-spring 24 is disposed between the upper side of the abutment 15 and the upper closure member.

The parts are shown in the drawings in the positions they would have at rest under normal adjustment and under normal load.

When a vehicle with which such a spring device is associated is running and up and down movement is imparted to the running-gear by irregularities of the roadway, upward movement against the load results in compression of the load-sustaining spring 21, the abutment 15, sleeve 17, and rod 14 moving downwardly with respect to the housing. On the rebound, the parts have a tendency to move in the opposite direction or upwardly. The rebound is counteracted and restrained to relieve it of suddenness and violence by the contractile spring 23. If the rebound is of sufficient force not to be entirely counteracted by the spring 23, then the rod 14 continuing its upward movement will move the disk 15 against the compression-resisting spring 24. It thus will be seen that the reaction from compression of the load-sustaining spring is counteracted and shocks absorbed first by the contractile spring 23, and thereafter by the spring 24 if the reaction is sufficient to make it necessary for the latter spring to be brought into action.

Figure 5:
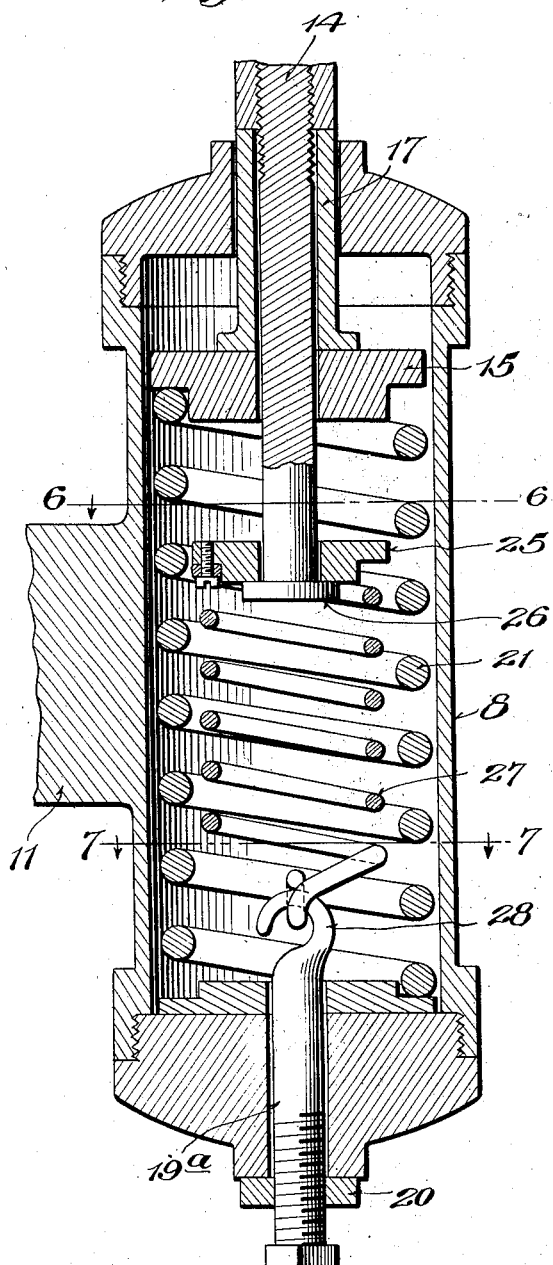
Fig. 5 is a longitudinal sectional view of another form.
Figure 6:
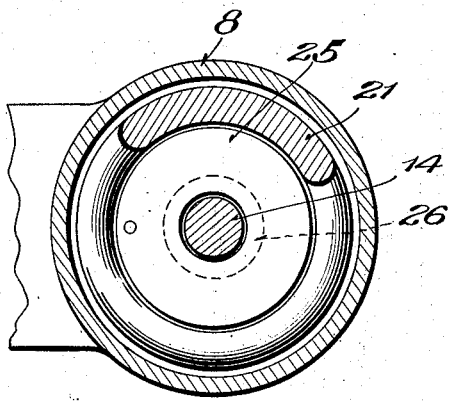
Fig. 6 is a transverse sectional view on the line 6—6, Fig. 5.
Figure 7:
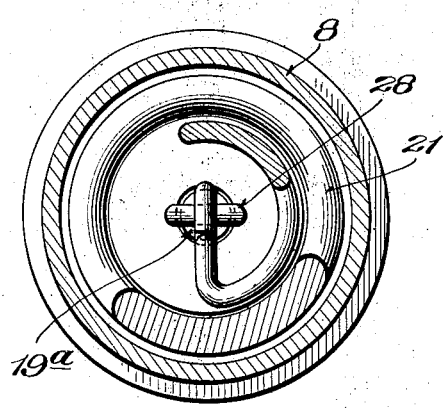
Fig. 7 is a transverse sectional view on the line 7—7, Fig. 5.

In the adaptation of the invention exemplified by Figs. 5, 6, and 7, the upper counteracting spring and guide-post are not employed. The sleeve 17, which is the main element in this as well as in the form previously described for sustaining weight between the load and the spring 21, bears on the abutment 15, and the rod 14 likewise extends downwardly through those parts. This rod has slidably mounted on its lower end portion an abutment 25, which is retained thereon by a head 26. A contractile coil-springs 27, corresponding to the spring 23 of the previously-described form, is secured at its upper end to this plate or abutment and at its other or lower end to a hook or similar member 28 on the upper end of a rod 19ª, the rod being movable upwardly or downwardly by means of the nut 20 to adjust the tension of the spring as in the case of the other form. The coaction of the two springs also is practically the same as in the previous form. In case the compression of the load-sustaining spring 21 is sufficient to permit the spring 27 to contract to its neutral state, no compression force thereafter will be exerted thereon, for the rod 14 will slide through the abutment 25. On the rebound, the enlarged terminal head of the rod will engage the abutment and will pull against the contractile spring, and the rebound thus will be cushioned and the shocks absorbed.

Having thus described my invention, what I claim as new, and desire to secure by Letters Patent, is—

1. A vehicle-spring device comprising a housing, a rod and a sleeve slidable thereon extending into said housing and arranged to sustain load, an abutment slidable on said rod normally in contact with one end of said sleeve, a shoulder on said rod limiting relative movement of said abutment in the opposite direction, a load-sustaining spring arranged to resist movement of said abutment under the influence of load, and a spring arranged to resist movement of said rod in the opposite direction.

2. A vehicle-spring device comprising a housing, a rod and a sleeve slidable thereon extending into said housing and arranged to sustain load, an abutment slidable on said rod normally in contact with one end of said sleeve, a shoulder on said rod limiting relative movement of said abutment in the opposite direction, a load-sustaining spring arranged to resist movement of said abutment under the influence of load, a spring arranged to resist movement of said rod in the opposite direction, and means for adjusting the tension of said latter spring.

3. A vehicle-spring device comprising an elongated housing having a removable closure member at each end, a rod and a sleeve slidable thereon extending through one closure member into the housing arranged to sustain load, an abutment slidable on said rod normally in contact with said sleeve, a shoulder on said rod limiting relative movement of said abutment in the opposite direction, a load-sustaining compression-resisting spring arranged to be compressed by said abutment, a contractile spring connected at one end to a fixed part and at the other end to one side of said abutment, and a compression-resisting spring disposed to restrain movement of said abutment in the direction opposite to that for compression of said load-sustaining spring.

4. A vehicle-spring device comprising an elongated housing having a removable closure member at each end, a rod and a sleeve slidable thereon extending through one closure member into the housing arranged to sustain load and said rod having a socket at its inner end, an abutment slidable on said rod normally in contact with said sleeve, a shoulder on said rod limiting relative movement of said abutment in the opposite direction, a load-sustaining compression-resisting spring arranged to be compressed by said abutment, an elongated fixed member extending into said rod-socket, and a contractile spring connected to said fixed member and to said abutment and arranged to resist movement of said rod and abutment in the direction opposite to that for compression of said load-sustaining spring.

5. A vehicle-spring device comprising an elongated housing having a removable closure member at each end, a rod and a sleeve slidable thereon extending through one closure member into the housing arranged to sustain load and said rod having a socket at its inner end, an abutment slidable on said rod normally in contact with said sleeve, a shoulder on said rod limiting relative movement of said abutment in the opposite direction, a load-sustaining compression-resisting spring arranged to be compressed by said abutment, an elongated fixed member extending into said rod-socket, a contractile spring connected to said fixed member and to said abutment and arranged to resist movement of said rod and abutment in the direction opposite to that for compression of said load-sustaining spring, and means for adjusting said fixed member and thereby the tension of said contractile spring.

6. A vehicle-spring device comprising an elongated housing having closed ends, a rod and a sleeve slidable thereon extending through one end into the housing arranged to sustain load and said rod having a socket at its inner end, a shoulder on said rod, an abutment slidable on said rod between said sleeve and shoulder, a load-sustaining compression-resisting spring arranged to be compressed by said abutment, an elongated fixed member extending into said rod-socket, a contractile spring connected to said fixed member and to one side of said abutment and a compression-resisting spring disposed on the opposite side of said abutment arranged to resist movement of said rod and abutment in the direction opposite to that for compression of said load-sustaining spring.

7. A vehicle-spring device comprising an elongated housing having closed ends, a rod and a sleeve slidable thereon extending through one end into the housing arranged to sustain load and said rod having a socket at its inner end, a guide-post mounted in the other end of said housing and extending into said socket, a shoulder on said rod, an abutment slidable on said rod between said sleeve and shoulder, a load-sustaining compression-resisting spring arranged to be compressed by said abutment, and a contractile spring connected to said guide-post and to one side of said abutment and a compression-resisting spring disposed on the opposite side of said abutment arranged to resist movement of said rod and abutment in the direction opposite to that for compression of said load-sustaining spring.

In witness whereof I affix my signature.

CLARANCE W. THOMPSON.